US008627760B2

(12) United States Patent
Kollep et al.

(10) Patent No.: US 8,627,760 B2
(45) Date of Patent: Jan. 14, 2014

(54) BEVERAGE PRODUCTION MACHINE WITH FUNCTIONAL BLOCK AND SUPPORT BASE

(75) Inventors: Alexandre Kollep, Lutry (CH); Alfred Yoakim, St-Légier-la Chiesaz (CH); Rémy Jacquet, Le Locle (CH); Pierre Struzka, Lausanne (CH)

(73) Assignee: Nestec S.A., Vevey (CH)

( * ) Notice: Subject to any disclaimer, the term of this patent is extended or adjusted under 35 U.S.C. 154(b) by 756 days.

(21) Appl. No.: 12/373,006

(22) PCT Filed: Jun. 21, 2007

(86) PCT No.: PCT/EP2007/056169
§ 371 (c)(1),
(2), (4) Date: Jan. 8, 2009

(87) PCT Pub. No.: WO2008/006682
PCT Pub. Date: Jan. 17, 2008

(65) Prior Publication Data
US 2009/0173235 A1    Jul. 9, 2009

(30) Foreign Application Priority Data

Jul. 11, 2006  (EP) .................................... 06014382

(51) Int. Cl.
*A47J 31/44*  (2006.01)
(52) U.S. Cl.
USPC ............................................ 99/279; 99/295
(58) Field of Classification Search
CPC .............. A47J 27/2105; A47J 31/4482; A47J 31/4417; A47J 31/4414

USPC ............................ 99/279, 295, 323; 439/929
IPC ...................... A47J 31/14,31/44, 31/46, 31/057
See application file for complete search history.

(56) References Cited

U.S. PATENT DOCUMENTS

| 3,391,632 | A | * | 7/1968 | Colonna | 99/279 |
| RE34,473 | E | * | 12/1993 | Ryan et al. | 99/307 |
| 5,916,351 | A | * | 6/1999 | Sintchak | 99/279 |
| 6,220,147 | B1 | | 4/2001 | Priley | 99/323 |
| 7,279,660 | B2 | * | 10/2007 | Long et al. | 99/295 |

(Continued)

FOREIGN PATENT DOCUMENTS

| CN | 1281276 A | 1/2001 |
| DE | 7 243 400 | 3/1973 |

(Continued)

OTHER PUBLICATIONS

EPO machine translation of DE3802639, retrieved from http://translationportal.epo.org/emtp/translate/?ACTION=description-r... EP&NUMBER=3802639&OPS=ops.epo.org&TRGLANG=en &ENGINE=google&SRCLANG=de, Sep. 20, 2011, 4 pages.*

(Continued)

*Primary Examiner* — Stephen F Gerrity
(74) *Attorney, Agent, or Firm* — Winston & Strawn LLP

(57) ABSTRACT

A beverage production machine that includes a functional block including a beverage extraction module and a beverage delivery outlet, and a support base on which the functional block is arranged and which is designed to supply the functional block electrically, wherein at least the beverage delivery outlet is mounted free in rotation around a vertical axis relative to the support base.

20 Claims, 5 Drawing Sheets

(56) References Cited

U.S. PATENT DOCUMENTS

| | | | |
|---|---|---|---|
| 2005/0023268 A1* | 2/2005 | Bardazzi et al. | 219/432 |
| 2005/0142911 A1* | 6/2005 | Khoury | 439/134 |
| 2005/0160918 A1* | 7/2005 | Winstanley et al. | 99/279 |
| 2006/0086256 A1* | 4/2006 | Heinze | 99/279 |

FOREIGN PATENT DOCUMENTS

| | | | |
|---|---|---|---|
| DE | 3 742 930 C1 | 10/1988 | |
| DE | 3802639 A1 * | 8/1989 | A47J 31/057 |
| DE | 19727614 A1 * | 1/1999 | A47J 31/44 |
| EP | 1388313 A2 * | 2/2004 | A47J 31/30 |
| EP | 1 502 525 A1 | 2/2005 | |
| EP | 1 632 157 A1 | 3/2006 | |
| FR | 2716792 A1 * | 9/1995 | A47J 31/44 |
| GB | 2388305 A * | 11/2003 | A47J 31/057 |
| WO | WO 0147399 A2 * | 7/2001 | A47J 27/21 |
| WO | WO 2005053489 A1 * | 6/2005 | A47J 31/40 |
| WO | WO 2006015950 A1 * | 2/2006 | A47J 31/46 |

OTHER PUBLICATIONS

EPO machine translation of WO2006015950, retrieved from http://translationportal.epo.org/emtp/translate/?ACTION=description-r...NUMBER=2006015950&OPS=ops.epo.org&TRGLANG=en&ENGINE=google&SRCLANG=de, Sep. 20, 2011, 6 pages.*
International Search Report PCT/EP2007/056169 Dated Aug. 21, 2007, 3 pages.

* cited by examiner

BEVERAGE PRODUCTION MACHINE WITH FUNCTIONAL BLOCK AND SUPPORT BASE

This application is a 371 filing of International Patent Application PCT/EP2007/056169 filed Jun. 21, 2007.

BACKGROUND

The present invention relates to beverage production machines which are designed to stand on a support surface such as for example a kitchen counter, a table or other.

The invention particularly relates to beverage production machines which are provided with water and which comprise a beverage extraction module in which a beverage can be produced by having the supplied water interact with the ingredients (extraction being just an example for all kind of interactions).

The beverage can then be obtained at a delivery outlet which is in fluid connection with the beverage extraction module.

One example for such beverage production machines are coffee machines which are designed for the insertion of a ingredient-containing capsule or pouch, such that the beverage production can be produced on the basis of the ingredients contained in the beverage capsule or pouch.

Traditionally, such coffee production machines are designed and dimensioned for a stationery use. For example, these machines are designed to be used at a fixed position in a kitchen and every user desiring to produce a coffee will have to go to the location of the coffee machine. It is not very convenient to displace such kind of coffee machines out of the kitchen and for example onto the table of a dining room. Even if one would want to place such a kitchen-use machine onto the table of a dining room, it would be inconvenient to displace the coffee machine towards each of the user in order to have the user prepare a fresh cup of coffee.

SUMMARY OF THE INVENTION

The invention now targets at beverage production machine which alleviates the above problem. In particular, the invention aims at improving conviviality and also preferably transportability of a beverage production machine.

Thereby it is the central idea of the invention that the beverage production machine is designed in an adaptable manner such that the machine can offer services to several users around the beverage production machine without having to displace the entire machine.

Generally, the problem is solved by means of the features of the independent claims. The dependent claims develop further the central idea of the present invention.

According to a first aspect of the present invention, a beverage production machine is proposed which essentially comprises a functional block arranged on a support base. The functional block includes at least a beverage extraction module and a beverage delivery outlet. The support base is designed such that the functional block can be arranged on the top of it and such that the support base can supply electrical power to the functional block. Finally, at least the beverage delivery outlet is mounted free in rotation (around the vertical axis on the support plane of the beverage production machine) relative to the support base. Thus, at least the beverage delivery outlet (or alternatively the entire functional block) can assume different rotational positions vis-à-vis the support base without having to move the support base. The transition between different rotational positions can be assumed in a discrete manner (steps) or in a continuous manner.

The functional block can be designed to be removable from the support base.

The removable connection between the functional block and the support base can comprise a cordless electrical connection.

The functional block can be arranged on the support base by means of a rotational sliding bearing.

The rotational bearing can comprise means for preventing a lateral displacement between the functional block and the support base of a defined position.

The matching surfaces of the functional block and support base can be profiled such that the profile guide a rotational movement of the functional block relative to the support base.

The matching surfaces and the functional block and support base can be selected or treated in order produce the sliding friction when rotating the functional block relative to the support base.

The functional block can be provided with a water supply reservoir.

The functional block can additionally comprise a cup support arranged essentially under the beverage delivery outlet.

The functional block can comprise a drip tray arranged under the beverage delivery outlet.

The functional block can comprise a cup heater. The cup heater can be placed circumferentially under the beverage outlet therefore providing user's access to cups from different angular positions around the device.

The support base can have a shape which is essentially symmetrical in rotation.

The functional block can have a base part which comprises a cup support and which is essentially symmetrical in rotation.

The support base can be provided with a power port to be plugged into a main connector.

The matching surfaces of the functional block and support base can be respectively provided with means for centering the functional block on the support base.

The support base can be connected to at least one satellite support base which is designed to provide electrical power to further connect beverage production machines and/or auxiliary electrical devices such as machines for producing beverages such as for example milk heating devices or other devices such as an additional cup heater, a radio and/or a lamp or other electrical appliances for instance.

Also the satellite support bases can be designed to enable a power supply to the connected machine and at the same time allow for a relative rotation of the functional block of the auxiliary device.

BRIEF DESCRIPTION OF THE DRAWINGS

Further aspects, objects and advantages procured by the present invention will become evident for the man skilled in the art when going through the following detailed explanation of the preferred embodiments of the present invention.

DETAILED DESCRIPTION OF THE INVENTION

Figure 1:
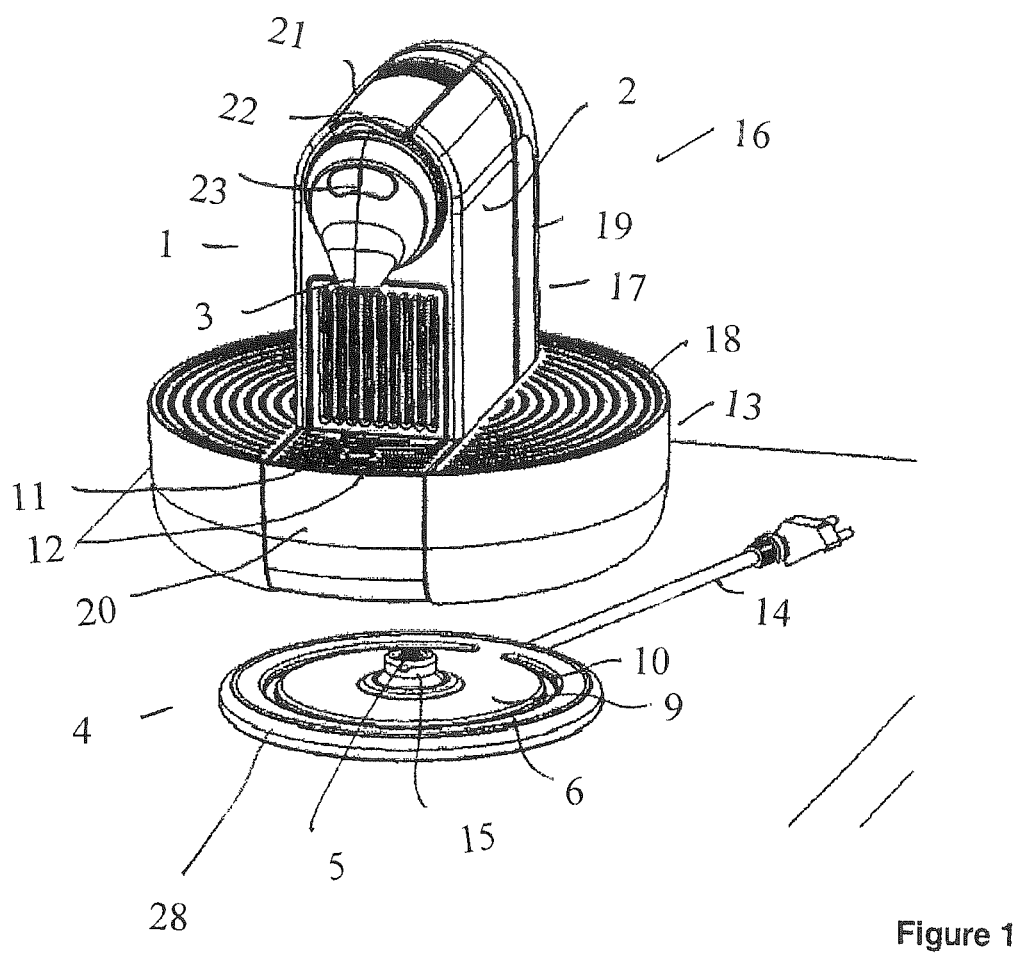
FIG. 1 shows a first embodiment of the present invention with a functional block of a beverage production machine according to the present invention is lifted from its support base.

FIG. 1 shows a beverage production machine, generally designated with the reference numeral 16, which comprises as main components a functional block 1 and an associated support base 4. In beverage production operation the functional block 1 is placed on top of the support base 4.

The support base 4 is designed to rest on a support surface such as e.g. a table or a kitchen counter.

In FIG. 1 the functional block 1 is lifted from the support base 4, which separation facilitates the handling (transport, travel, . . . ) of the machine 16 in smaller units.

As can be schematically seen in FIG. 1, the functional block 1 comprises a beverage extraction module 2 and a beverage delivery outlet 3 from which a beverage produced in the extraction module 2 can be obtained.

On the rear side of the functional block 1 a water supply reservoir 19 can be provided.

The functional block 1 as shown has a tower-like main part 17 as well as a base part generally referenced with 13.

The base part 13 can have essentially the shape of a relatively flat cylindrical platform, i.e. it is symmetrical in rotation.

The upper surface 18 of the base part 13 can serve as a cup support 11 in the region which is essentially arranged vertically below the beverage delivery outlet 3.

The segment 20 of the base part 13 of the functional block 1 can have an integrated drip tray 12 for collecting liquid dripping from the beverage delivery outlet 3. The segment 20 with the drip tray 12 can be made removably from the base part 13 of the functional block 1 in order to rinse and/or empty the drip tray 12.

Inside the functional block 1 the beverage extraction module 2 can comprise a water pump, a water heating unit such as for example a thermoblock or a boiler as well as an extraction chamber. Thus the functional block 1 is capable of producing a heated, preferably pressurized liquid and then to feed it into a chamber of the extraction module 2 in order to prepare a beverage in a cup or glass.

The extraction chamber can be designed to house a beverage ingredient-containing pouch or capsule, which can be inserted from the top surface 21 of the functional block 1 when lifting or opening a lever or lid 22 arranged at the top surface 21. Heated water, preferably under pressure, will then be injected into the capsule in order to interact with the ingredients contained therein.

The functional block 1 can furthermore be provided with a user interface 23 such as for example switches or buttons in order to control the operation of the beverage production machine.

Selectively, the functional block 1 can be placed on top of a matching surface 9 of the support base 4. The support base 4 is provided with a power cord 14 which can be plugged into a mains connector. The support base 4 is furthermore provided with an electrical connector 5 which can be a cordless electrical connector such as for example a so-called "Strix" (trademark) connecting device commercialised by Strix Company Ltd.

As will be explained later on, the lower side of the functional block 1 is provided with electrical connection means such that it can be supplied with electrical power from the support base 4 via the preferably cordless electrical connection 5.

Preferably, the cordless electrical connection 5 is arranged in the centre of the matching surface 9 of the support base 4.

The electrical connector 5 or other structures raising from the support base 4 can also serve as means 15 for centering and matching the functional block 1 on the support base 4 in a defined position while allowing a free rotation of the functional block 1 about a substantially pivot axis about the (static) support base.

According to the invention, the cooperation of the functional block 1 and the support base 4 is designed such that at the same time when the functional block 1 is supplied with electrical power by the support base 4, it can still be rotated around the vertical axis relative to the support base 4. To this regard, the matching surfaces of the functional block 1 and the support base 4 are designed as a rotational sliding bearing around the centre of the support base 4.

Additionally profiling means could be provided on the top surface of the support base 4 (and a matching lower side of the functional block 1) which promote a rotational guiding of the functional block 1 relative to the support base 4 and which limit the risk of electrical displacement of the functional block 1 vis-à-vis the support base 4.

Additionally, the top surface 9 of the support base 4 and the matching lower side of the functional block 1 can be selected or treated such that the friction between these two cooperating surfaces is reduced. For instance, rolling elements such as pads, marbles or rollers could also be added on the upper surface 9 of the support base or on the lower surface 8 of the functional block to favour rotational gliding. A liquid collecting means such as a groove 10 could also be provided on the surface of the matching surface to collect residual liquid which could accidentally drip on the base support and so to maintain the bearing surface clean.

With the example according to FIG. 1 it is thus possible to produce a beverage such as for example coffee while the functional block 1 is placed on top of the support base 4. Even during the operation of the functional block 1 the beverage outlet 3 can assume different rotational positions vis-à-vis the support base 4 without moving the support base 4 itself. Even when rotated the functional block will be continuously be supplied with power through the support base 4.

In the embodiment as shown in FIG. 1 the entire functional block 1 is mounted free in rotation vis-à-vis the support base 4.

Note that the present invention also covers embodiments in which simply the beverage outlet 3 can be rotated vis-à-vis other elements of the functional block 1 around the vertical axis on the support base 4, as long as the beverage outlet 3 can be oriented to different users placed around the coffee production machine 16.

Figure 2:
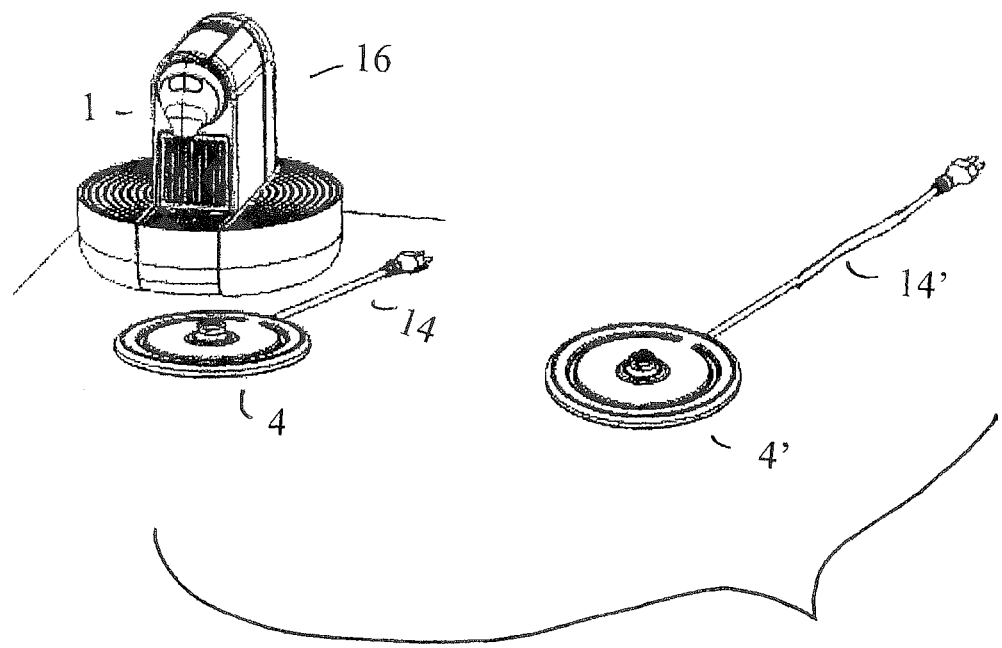
FIG. 2 shows a embodiment in which a set of different support bases, essentially having different power ports is provided.

FIG. 2 illustrates that it is a further advantage of the present invention that different support bases 4, 4' can be provided as a set, wherein the functional block 1 can be used in connection with all of these different support bases 4, 4'. In the embodiment shown in FIG. 2 the first support base 4 essentially distinguishes from the second support base 4' by the length of its associated power cord 14 and 14', respectively. Therefore, while the length of the power cord 14 is mainly adapted for a stationery use in a kitchen etc., the longer power cord 14' is adapted for use e.g. on the table of the dining room. In an option, one single support base 4 can be provided with at least two removable power cords of different lengths.

The use in connection with different support base is a further advantage of the separability of the functional block 1 off the support base 4.

Figure 3:
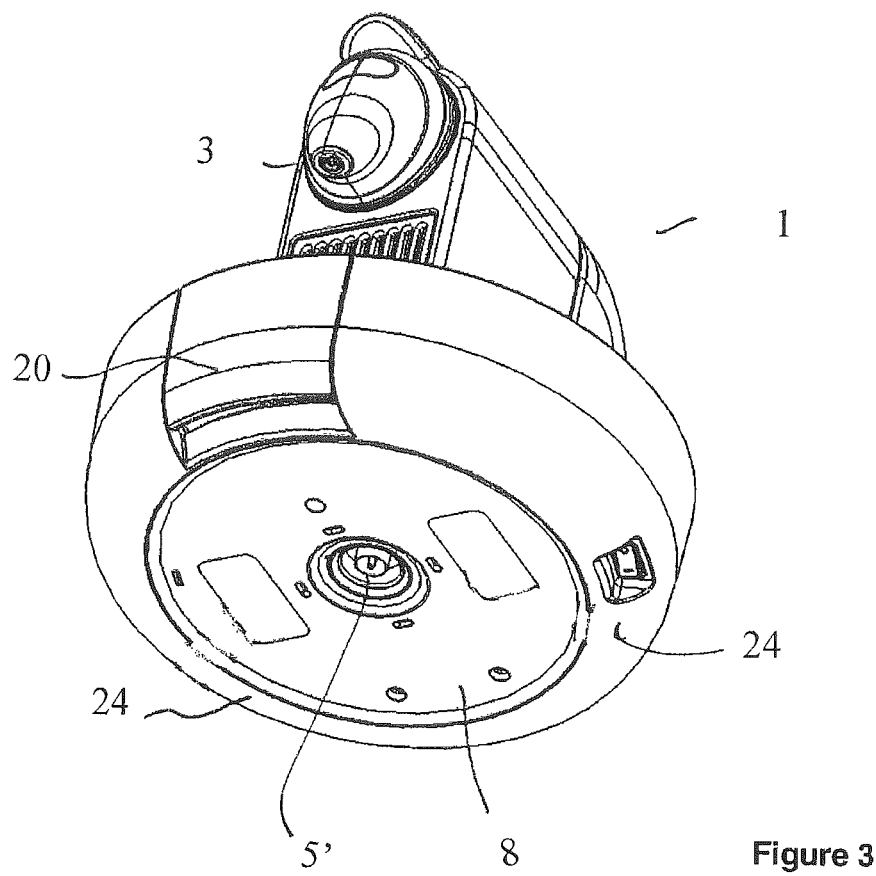
FIG. 3 shows the lower (matching) face of a functional block according to the present invention.

FIG. 3 shows the functional block 1 when seen from below such details from the lower face 8 cooperating with the face 9 of the support base 4 are visible.

Both, FIG. 1 and FIG. 3 show that at least the base part 13 of the functional block 1 has also a shape essentially symmetrical in rotation, wherein the illustrated disc-shape only serves as an example. In the shown embodiment it is actually of a circular contour.

The cross-sectional dimensions of the tower of the functional block 1 are made smaller than the diameter of the support base 4.

The lower face 8 of the functional block 1 is provided with the matching connector 5' adapted to cooperate in a cordless manner with the connector 5 of the support base 4.

The reference numeral 24 designates a peripheral area of the lower face 8 of the functional block 1 which is dedicated to reduce the friction and which can be made for example from a plastic such as Polyethylene or PTFE material (such as Teflon). The surface 24 can have a trunconical shape which matches with a trunconical shaped peripheral surface 28 of the base 4.

Pads in durable plastic and low friction ratio can be placed on the lower surface of the block such as PTFE or POM (polyoxymethylene).

Figure 4:
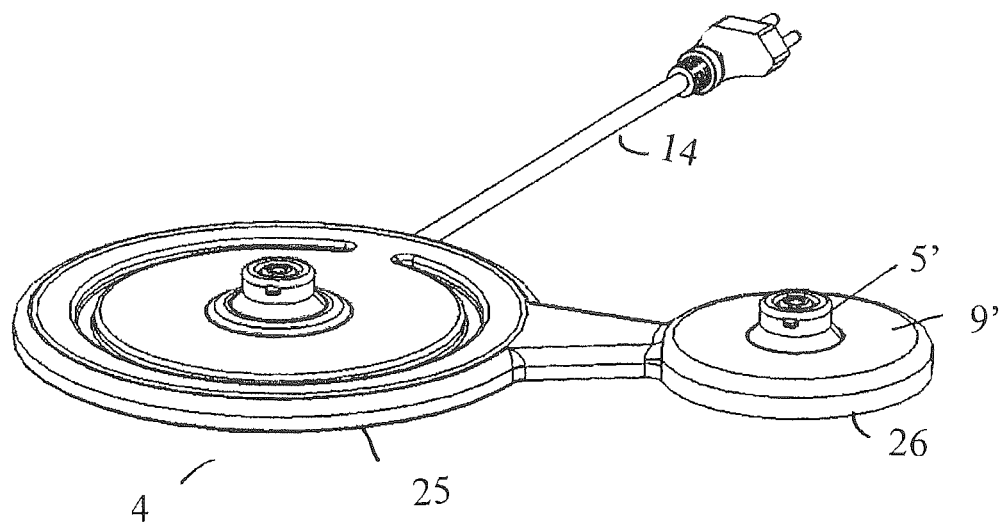
FIG. 4 shows a support base with a satellite support base according to the present invention.

FIG. 4 shows an embodiment of the support base 4 in which the support base 4 comprises a main support base 25 as well as at least one electrically connected satellite support base 26. The main support base 25 supplies also the satellite support base 26 with electrical power. Also the satellite support base 26 is provided with a connecting surface 9', essentially in the centre of which the electrical connector 5' is provided.

Figure 5:
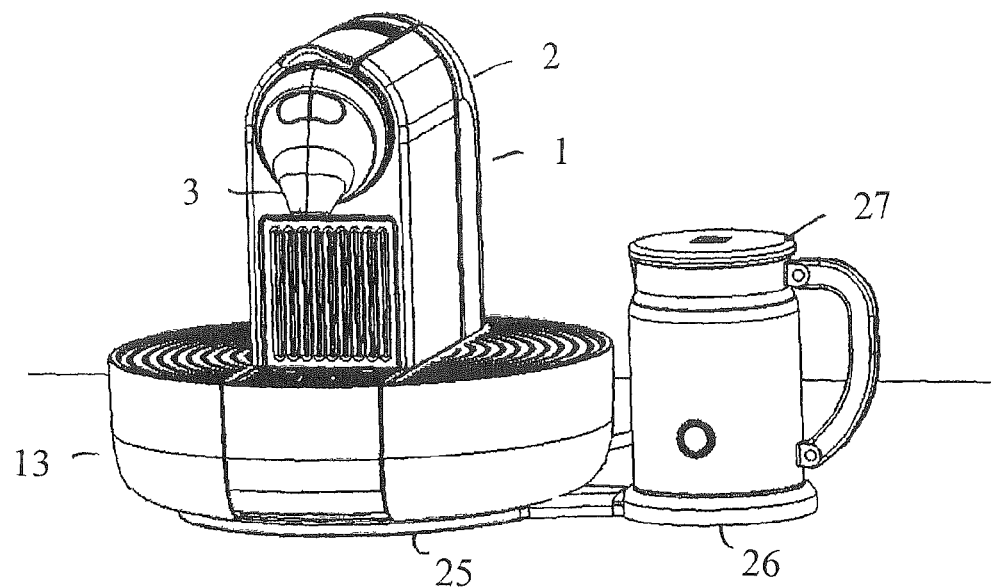
FIG. 5 shows the example of FIG. 4 in which a functional block of a beverage production machine is placed on the main support base and an auxiliary device for beverage production is placed on the satellite support base.

As it is illustrated in FIG. 5, on the matching surface 9' of the satellite support base 26 either further functional blocks 1 can be placed, or, in a preferred manner, auxiliary devices such as for example milk heating units 27 can be provided.

The support base can be configured at its lower surface with a storing recess and hook means or magazine to enable the electrical cord 14 to be wound or stored under the base. The base can also be provided with a manual or automatic cord rigger.

In a possible variant, the beverage delivery outlet could be activated in rotation by a motorized system.

What is claimed is:

1. A beverage production machine comprising:
a functional block including a beverage extraction module that houses a beverage ingredient containing pouch or capsule that receives water for extraction of a beverage therefrom, a water pump, and a beverage delivery outlet, and
a separate support base on which the functional block is removably arranged and which is operatively associated therewith to supply the functional block electrically such that when the functional block is arranged on the support base, the support base supplies electrical power to the functional block for operation of the pump and extraction of the beverage from the pouch or capsule, and when the functional block is removed from the support base, the pump is not operational and the beverage cannot be extracted or dispensed from the functional block,
wherein at least the beverage delivery outlet and the functional block are mounted free in rotation relative to the support base, the functional block is operative to extract and dispense a beverage only when arranged on the support base, and the beverage is delivered through the delivery outlet at various circumferential positions after rotation of the functional block with respect to the base.

2. The machine according to claim 1, wherein the removable connection between the functional block and the support base comprises a cordless electrical connection.

3. The machine according to claim 1, wherein the functional block is arranged on the support base via a rotational sliding bearing.

4. The machine according to claim 3, wherein the rotational sliding bearing includes means for preventing lateral displacement between the functional block and the support base.

5. The machine according to claim 1, wherein the functional block and the support base have matching surfaces that are profiled in order to guide rotation of the functional block relative to the support base.

6. The machine according to claim 1, wherein the functional block and the support base have matching surfaces that are selected or treated in order to reduce friction when rotating the functional block relative to the support base.

7. The machine according to claim 1, wherein the functional block includes a water supply.

8. The machine according to claim 1, wherein the functional block includes drip tray arranged under the beverage delivery outlet.

9. The machine according to claim 1, wherein the support base has shape which is essentially symmetrical in rotation.

10. The machine according to claim 1, wherein the support base is provided with a power cord.

11. The machine according to claim 1, wherein the functional block and the support base have matching surfaces that are respectively provided with means for centering the functional block on the support base.

12. The machine according to claim 1, wherein at least the beverage delivery outlet can assume different rotational orientations relative to the support base, and wherein different rotational positions of the beverage delivery outlet are designed to have a discrete or continuous transition.

13. The machine according to claim 1, wherein the functional block is designed for producing a heated pressurized liquid.

14. The machine according to claim 1, wherein the beverage extraction module is designed for housing a beverage ingredient-containing pouch or capsule.

15. A beverage production machine, comprising:
a functional block including a beverage extraction module, a water pump, and a beverage delivery outlet, and
a support base on which the functional block is arranged and which is designed to supply the functional block electrically,
wherein the functional block has a base part that includes a cup support arranged under the beverage delivery outlet.

16. A beverage production machine, comprising:
a functional block including a beverage extraction module, a water pump, and a beverage delivery outlet, and
a support base on which the functional block is arranged and which is designed to supply the functional block electrically,
wherein the functional block includes a cup heater.

17. A beverage production machine comprising:
a functional block including a beverage extraction module and a beverage delivery outlet,
a first support base on which the functional block is arranged and which is designed to supply the functional block electrically, wherein at least the beverage delivery outlet is mounted in rotation relative to the support base, and a second support base, wherein each support base is provided with a power cord and the power cord for the second support base is of greater length than the other power cord.

18. A beverage production machine comprising:
a functional block including a beverage extraction module and a beverage delivery outlet, and
a support base on which the functional block is arranged and which is designed to supply the functional block electrically, wherein at least the beverage delivery outlet is mounted in rotation relative to the support base,
wherein the support base is connected to at least one satellite support base which is designed to provide electrical power to further connected beverage production machines or auxiliary electrical devices.

19. The machine according to claim 18, wherein the satellite support base is further designed to enable a power supply to be connected to the machine and at the same time allow for a relative rotation of the functional block of the further connected beverage production machine or auxiliary electrical device.

20. A beverage production machine comprising:
a functional block including a beverage extraction module and a beverage delivery outlet, and
a support base on which the functional block is arranged and which is designed to supply the functional block electrically,
wherein at least the beverage delivery outlet is mounted in rotation relative to the support base, and
wherein the functional block has a base part, which comprises a cup support and which is essentially symmetrical in rotation with the beverage outlet.

* * * * *